United States Patent

Cho et al.

[11] Patent Number: 6,068,913
[45] Date of Patent: May 30, 2000

[54] SUPPORTED PCD/PCBN TOOL WITH ARCHED INTERMEDIATE LAYER

[75] Inventors: Hyun Sam Cho, Salt Lake City, Utah; Kyung-Yul Han, Chungchungnam-Do, Rep. of Korea

[73] Assignee: Sid Co., Ltd., Rep. of Korea

[21] Appl. No.: 08/932,473

[22] Filed: Sep. 18, 1997

[51] Int. Cl.⁷ .................................................. B24D 11/00
[52] U.S. Cl. ........................... 428/212; 175/434; 75/237; 428/323; 428/457; 428/472; 428/698
[58] Field of Search .................... 428/212, 257, 428/469, 698, 472, 323; 75/237; 175/434

[56] References Cited

U.S. PATENT DOCUMENTS

| | | | |
|---|---|---|---|
| 2,944,323 | 7/1960 | Stadler | 29/95 |
| 3,136,615 | 6/1964 | Bovenkerk et al. | |
| 3,141,746 | 7/1964 | De Lai | |
| 3,743,489 | 7/1973 | Wentorf, Jr. et al. | |
| 3,745,623 | 7/1973 | Wentorf, Jr. et al. | |
| 4,592,433 | 6/1986 | Dennis | 175/329 |
| 4,604,106 | 8/1986 | Hall et al. | 51/293 |
| 4,626,407 | 12/1986 | Veltri et al. | 419/18 |
| 4,629,373 | 12/1986 | Hall | 407/118 |
| 4,716,975 | 1/1988 | Dennis | 175/329 |
| 4,784,023 | 11/1988 | Dennis | 175/329 |
| 5,011,515 | 4/1991 | Frushour | |
| 5,151,107 | 9/1992 | Cho et al. | |
| 5,211,726 | 5/1993 | Slutz et al. | 51/293 |
| 5,351,772 | 10/1994 | Smith | 175/428 |
| 5,498,480 | 3/1996 | Tank et al. | 428/408 |
| 5,662,720 | 9/1997 | O'Tighearnaigh | 51/295 |

*Primary Examiner*—Archene Turner
*Attorney, Agent, or Firm*—Thorpe North & Western, LLP

[57] ABSTRACT

A new PCD/PCBN tool and method for making the same involve the use of an intermediate layer of polycrystalline material between a substrate and an outer working layer. The intermediate layer is formulated to limit or prevent the amount of cobalt or other binders which may infiltrate the outer working layer and accelerate deterioration under high throughput conditions. In accordance with one aspect of the invention, the substrate is corrugate or rounded projections to both reduce stress and to decrease infiltration of cobalt through the polycrystalline structures. In accordance with another aspect of the invention, the bonding medium and/or binder agents in the intermediate layer may be selected to decrease mobility of cobalt and the like.

8 Claims, 7 Drawing Sheets

SUPPORTED PCD/PCBN TOOL WITH ARCHED INTERMEDIATE LAYER

BACKGROUND OF THE INVENTION

1. Field of the Invention

The present invention relates to cutting tools which have a cutting, grinding, drilling, etc., surface formed of polycrystalline diamond (PCD) or polycrystalline cubic boron nitride (PCBN). More specifically, the present invention relates to such tools in which an intermediate layer is disposed between the substrate and polycrystalline outer layer to extend the useful life of the cutting tool.

2. State of the Art

In the application of cutting, turning, drilling and machining tools, both tool wear and production throughput rates are of critical importance. If a tool is highly wear resistant, but can only be used at low throughput rates, its usefulness is significantly limited, as the profitability of many industries depends on being able to produce a large number of pieces with as little machinery as possible. Likewise, if a tool allows for a high throughput rate but does not have significant wear resistance, the time savings of the high throughput is often negated by the down-time and expense associated with replacing the tool.

Because of their significant resistance to wear, industries which utilize cutting, grinding, machining, turning and drilling tools typically use tools having PCD or PCBN segments. The hardness of the diamond or cubic boron nitride enables the tools to cut through considerable amounts of material with relatively little wear.

In forming a conventional diamond or cubic boron nitride tool, a layer of the polycrystalline material is bonded to a support material such as a tungsten carbide substrate. While diamond and cubic boron nitride are super hard and good thermoconductors, tungsten carbide is a strong shock and heat absorber, and is also a relatively strong and ductile body. Typically, the tungsten carbide contains about thirteen percent cobalt.

The polycrystalline material, the cobalt and tungsten carbide support are then subjected to a high pressure, high temperature manufacturing method such as that disclosed in U.S. Pat. No. 3,745,623 to Wentorf. In that patent, Wentorf describes a diamond sintered PCD integrally bonded to a strong tungsten carbide substrate for diamond machining applications. U.S. Pat. No. 3,743,489, also to Wentorf, discusses making a similar tool with a cubic boron nitride powder resulting in a PCBN compact.

While PCD and PCBN tools are extremely wear resistant, they are prone to becoming extremely hot under high throughput situations. For example, in Industrial Diamond Review (Vol. 56, No. 569, Page 40) A.M. Abrao documents that tool temperature increases proportionally with the speed of cutting. Thus, a PCBN cutting tool working against hot work die steel can exceed 800° C. at 200 m/min. PCD also behaves likewise. The higher the throughput of the element to be cut, ground, drilled, etc., the higher the temperatures the cutting tool will reach.

While PCD and PCBN are extremely durable materials, tools using these materials are subject to heat degradation. Unlike diamond or cubic boron nitride which have a high degree of thermal conductivity, cobalt has a high degree of thermal expansion. Thus, while the diamond or cubic boron nitride expands very little as temperature increases, the cobalt's expansion can be significant. Additionally, the cobalt can serve as a catalyst for reactions, such as the pseudo-oxidation reaction by which diamond particles can be converted to graphite. Furthermore, excess migration of the cobalt from the tungsten carbide can also result in weakness at the upper layer of the substrate, possibly causing separation between the substrate and the diamond particles.

The thermal expansion and catalytic effects of the cobalt would be less of a concern if the cobalt remained exclusively at the interface between the polycrystalline material and the tungsten carbide substrate. However, it is well known that cobalt tends to migrate from the tungsten carbide substrate and infiltrate the polycrystalline compact during the high pressure, high temperature manufacturing process. The migration of the cobalt is not quantitatively controllable and currently available tools, such as General Electric's BZN-6000 PCBN cutter, contain significant amounts of cobalt in the PCBN compact even though cobalt is known to be an improper PCBN binder except for ensuring suitable bonding between the PCBN and the tungsten carbide substrate. Thus, it is difficult to optimize the polycrystalline material for desired tool performance. As the polycrystalline material heats up due to friction with the piece worked, the cobalt expands and destabilizes the polycrystalline compact, and/or serves as the catalyst for graphite formation. Either of these, in turn, causes the PCD or PCBN structure to be prone to failure. The failure may be the result of PCD layer delamination, deterioration of the microstructure, or tool chipping. Regardless of the cause, the tool must be replaced and productivity is lost during the resulting down-time.

Thus, industry is placed in the dilemma of utilizing the high wear resistant PCD or PCBN tools and limiting the speed at which items are worked, or running the tools at a high throughput rate and allowing high failure rate. As the economics of high throughput become increasingly important, those in industry must continue to find ways to improve both the wear resistance and heat tolerance of such tools.

Thus, there is a need for improved PCD and PCBN tools which are better able to provide significant wear resistance, while simultaneously resisting failure under high throughput, high temperature conditions. Such tools should be relatively easy and inexpensive to make. Such tools should also be relatively inexpensive and easy to use.

SUMMARY OF THE INVENTION

Thus, it is an object of the present invention to provide an improved tool having a polycrystalline working portion which is less susceptible to deterioration or failure under high heat conditions.

It is another object of the present invention to provide such a tool having improved microstructure within the polycrystalline compact.

It is another object of the present invention to provide such a tool having improved stress stability.

It is still another object of the present invention to provide such a tool which provides longer tool life under high shear conditions.

The above and other objects of the invention are realized in specific illustrated embodiments of an improved PCD/PCBN tool including a substrate and an outer layer of polycrystalline diamond or polycrystalline cubic boron nitride compact. Disposed between the substrate and the polycrystalline compact is an intermediate layer which includes polycrystalline material.

In accordance with one aspect of the invention, the polycrystalline material of the intermediate layer is configured to prevent migration of cobalt into the polycrystalline compact of the outer layer. In order to ensure bonding between the intermediate layer and the substrate, cobalt or some bonding material may be included in the intermediate layer. However, the intermediate layer is configured to prevent infiltration of the outer layer by the cobalt. Control over cobalt migration is typically provided by regulating PCD/PCBN particle size and by controlling the amount of binder and/or bonding medium used. For example, PCD/PCBN particle size can be limited to 0.5–20 µm, thereby limiting the ability of the cobalt to move through the diamond particles. Likewise, a high amount of bonding medium, i.e. up to 30 percent by weight of a nitride, carbide or carbonitride of a transition metal of group IVb, Vb or VIb or aluminum nitride, will significantly reduce the ability of the cobalt to migrate. Furthermore, including a small amount of cobalt in the diamond compact can also limit diamond migration.

If any cobalt is able to reach the interface between the outer layer of polycrystalline compact and the intermediate layer, the cobalt will typically form a bond between the two layers rather than infiltrating the outer layer.

In accordance with another aspect of the invention, the substrate is formed with a corrugated surface. The intermediate layer is disposed on the corrugated substrate so as to have a corrugated face adjacent the substrate, and a substantially planar face opposite the substrate. The corrugated interface between the substrate and the intermediate layer provides improved stability in the tool. Additionally, the corrugated interface changes the diffusion path of cobalt used as a binder between the substrate and the intermediate layer. Because cobalt tends to migrate out of the tungsten carbide in a direction perpendicular to the interface, the cobalt travels in a semi-vertical path and must move a greater distance before encountering the polycrystalline material of the outer layer.

The intermediate layer provides several advantages with respect to the polycrystalline tool. For example, the expansion characteristics of the tool change. Conventionally, the polycrystalline material undergoes very little expansion under high heat conditions, while the tungsten carbide or other substrate undergoes considerable expansion. By disposing an intermediate layer between the polycrystalline outer layer and the substrate, a more gradual expansion gradient is achieved. The outer layer expands very little, the polycrystalline/cobalt mixture of the intermediate layer expands a moderate amount, and the substrate expands considerably. By having the more moderate changes in expansion between adjoining layers, the stresses on the tool are decreased.

Additionally, as mentioned above, the use of a corrugated substrate and a corrugated intermediate layer increases the stability of the working structure. Instead of having linear compression and tension regions, the corrugated interface forms a working member with alternating compression and tension regions. Such regions provide increased stability and decrease the risk of chipping, etc.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Reference will now be made to the drawings in which the various elements of the present invention will be given numeral designations and in which the invention will be discussed so as to enable one skilled in the art to make and use the invention. It is to be understood that the following description is only exemplary of the principles of the present invention, and should not be viewed as narrowing the pending claims.

Figure 1A:
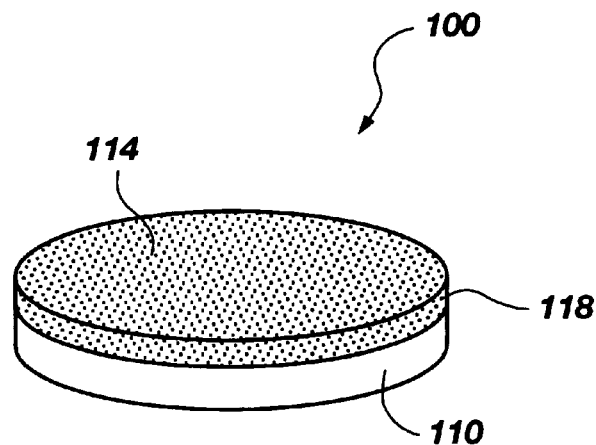
FIG. 1A shows a perspective view of a polycrystalline working element with a polycrystalline compact and a substrate in accordance with the teachings of the prior art.

Referring to FIG. 1A, there is shown a perspective view of a polycrystalline working element, generally indicated at 100, made in accordance with the teachings of the prior art. The working element 100 includes a tool substrate 110, which is typically cobalt cemented tungsten carbide, a polycrystalline outer working layer 114 which is formed from polycrystalline diamond or polycrystalline cubic boron nitride. A bonding layer 118 is disposed between the substrate 110 and the polycrystalline outer working layer 114. Typically, the bonding layer includes cobalt.

Figure 1B:
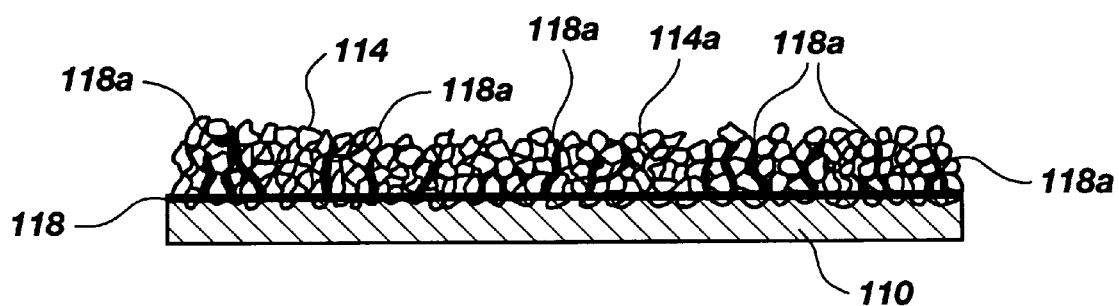
FIG. 1B shows a cross-sectional view of the polycrystalline working element of FIG. 1A to show cobalt infiltration of the polycrystalline compact.

While cobalt is an extremely good binder material, it has the disadvantage that it tends to infiltrate the polycrystalline material of the outer working layer 114 as shown in the close-up cross-sectional view of FIG. 1B. The cobalt 118a, which has migrated from the tungsten carbide substrate 110, infiltrates the polycrystalline material of the outer working layer 118 and is very detrimental to the life of the outer working layer. As the outer surface 114a of the polycrystalline material contacts a piece being cut, ground, drilled, etc., considerable heat is developed. The high thermoconductivity of PCD and PCBN allows the heat to quickly move toward the substrate 110. However, the cobalt 118a in the outer working layer 114 is highly thermoexpansive and expands as the outer working layer's temperature increases. The expansion is significant enough to decrease the stability of the microstructure of the outer working layer 114. Additionally, the cobalt can serve as a catalyst for the reaction whereby diamond is changed into graphite like material.

Figure 1C:
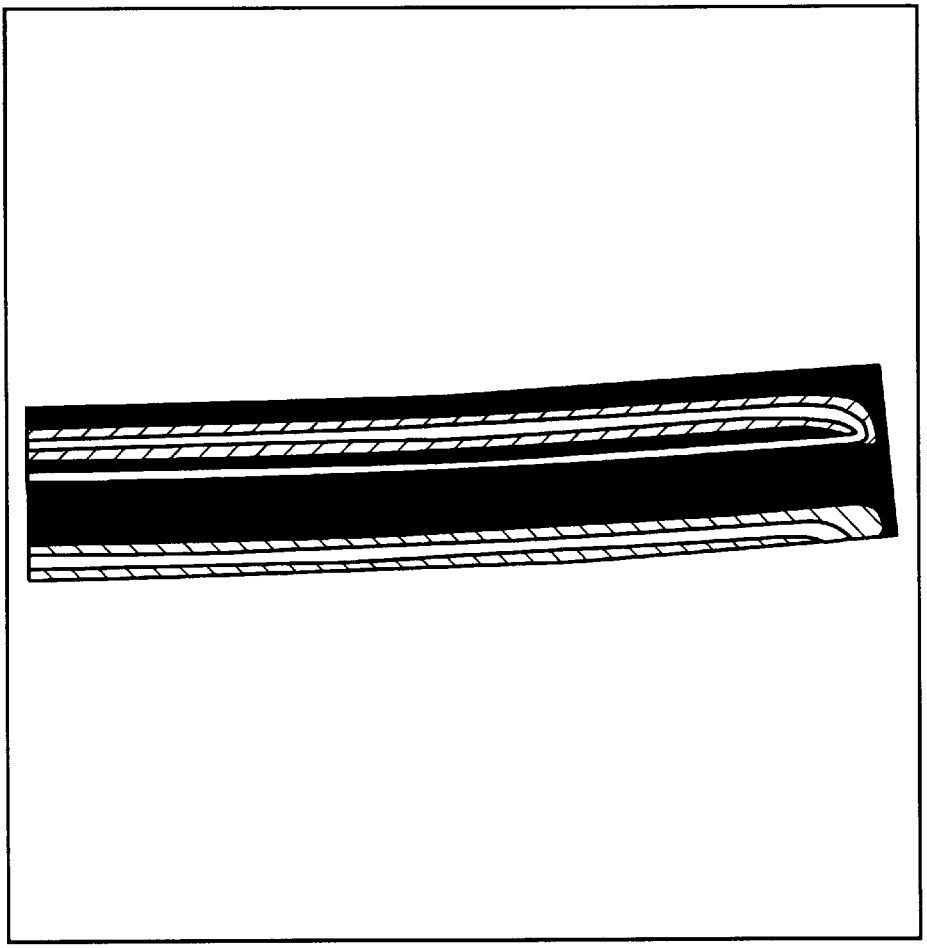
FIG. 1C shows a graph of the Y-component stress, which is perpendicular to the substrate of the polycrystalline working element, when the polycrystalline working element of FIGS. 1A and 1B is heated to 600 degrees C.

Another problem which is present in the prior art is that the microstructure between the polycrystalline material and the bonding between the polycrystalline material and the tungsten carbide substrate is generally linear stress regions, as is indicated in the graph shown in FIG. 1C. The linear stress regions render the polycrystalline working layer 114 less stable, especially at high temperature, than might otherwise be obtained by staggering compression and tension regions.

Figure 2A:
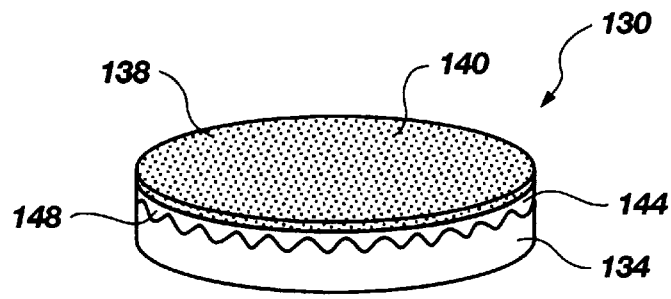
FIG. 2A shows a perspective view of a polycrystalline working element with a polycrystalline compact, a substrate, and an intermediate layer in accordance with the principles of the present invention.

Turning now to FIG. 2A, there is shown a perspective view of a polycrystalline working element made in accordance with the principles of the present invention. The polycrystalline working element, generally indicated at 130, includes a substrate 134 which is typically formed of tungsten carbide or some other similar material. As shown in FIG. 2A and discussed in additional detail below, the substrate 134 does not have a planar upper surface (the surface to which the polycrystalline material will be attached). Rather, the substrate 134 has a corrugated surface having a plurality of convex portions offset by concave portions similar to a meat tenderizer.

The working element 130 also includes a polycrystalline compact 138 which forms an outer working layer 140. The polycrystalline compact 138 can be formed from diamond particles and/or cubic boron nitride particles. Unlike the substrate 134, the polycrystalline compact 138 will typically have a generally planar surface, although other configurations can be formed if desired.

Disposed between the substrate 134 and the polycrystalline compact 138 is an intermediate layer 144. The intermediate layer is also formed with a polycrystalline material (either PCD or PCBN). However, the intermediate layer will typically include additional amounts of bonding medium and may also include, as will be discussed below, cobalt. The intermediate layer is carefully formulated to resist migration of cobalt, and thereby prevents the outer working layer 140 from being infiltrated with cobalt. Resistance to cobalt migration can be achieved by controlling the microstructure disposed within the intermediate layer, by selection of binding agents, and by the geometry of the interface 148 between the substrate 134 and the intermediate layer 144.

Figure 2B:
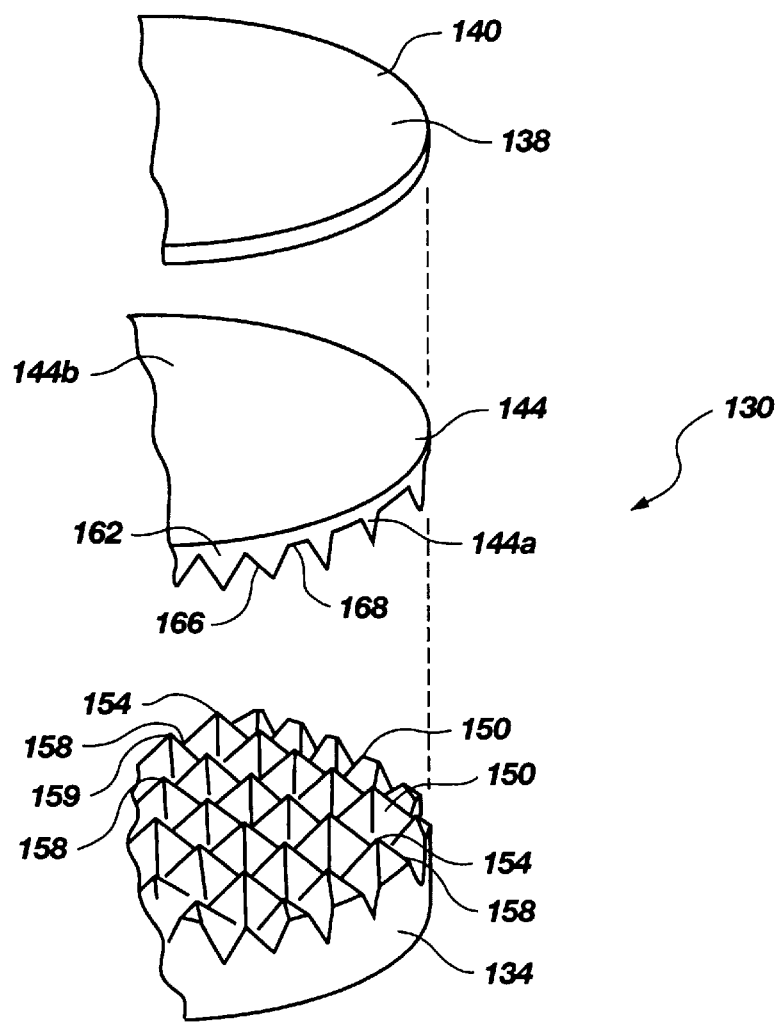
FIG. 2B shows a fragmented, exploded view of the polycrystalline working element of FIG. 2A.

FIG. 2B shows a fragmented, exploded view of the polycrystalline working element 130 of FIG. 2A. The substrate 134 has a plurality of projections (some of which are identified at 150) disposed thereon. The projections form a corrugated surface having alternating convex peaks 154 and concave valleys 158. Preferably, each of the projections is configured in the shape of a arch-like mound similar to a rounded four sided pyramid. However, those skilled in the art will appreciate that cone or other geometric shaped projections could also be used.

The lower (substrate bonding) side 144a of the intermediate layer 144 likewise has a plurality of projections 162 which form peaks 166 and valleys 168 after formation. The peaks and valleys 166 and 168 of the intermediate layer 144 align with the peaks and valleys 154 and 158 of the substrate 134 so that the projections 162 of the intermediate layer nest between the projections 150 of the substrate. For reasons which will be discussed throughout the remainder of the patent, the nonplanar interface between the intermediate layer 144 and the substrate 134 decreases stress and assists in the control of cobalt migration.

Unlike the lower side 144a, the upper (polycrystalline compact bonding) side 144b is generally planar. Because the intermediate layer 144 and the outer working layer 140 both contain significant amounts of polycrystalline material (either PCD or PCBN), the bonding between the intermediate layer and the outer working layer is much easier and is less likely to be negatively impacted by heat or degradation.

Figure 2C:
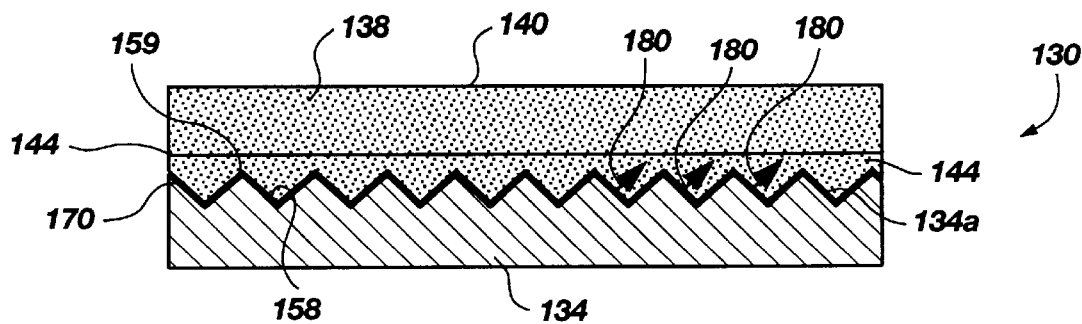
FIG. 2C shows a cross-sectional view of the polycrystalline working element of FIGS. 2A and 2B.

Turning now to FIG. 2C, there is shown a cross-sectional view of the working element 130. The working element 130 is formed with a cobalt 170 cemented tungsten carbide substrate 134 or a substrate made from a similar material. The intermediate layer 144 is bonded to the substrate 134 by the cobalt 170 which migrates from the cemented tungsten carbide. Additionally, the force and each result in mechanical attachment between the tungsten carbide and the diamond. The outer working layer 140 is bonded to the intermediate layer 144.

It is a principle object of the present invention to eliminate or drastically reduce the amount of cobalt 170 which is able to reach the outer working layer 140, where it can destabilize the polycrystalline material 138 and otherwise lead to premature failure of the outer working layer. This is accomplished in several ways. First, by providing a corrugated substrate 134 and a meshing intermediate layer 144, the ability of the cobalt 170 to reach the outer working layer 140 is reduced. Under the high pressure, high temperature manufacturing process normally used for making PCD or PCBN working elements, the cobalt 170 will tend to migrate in a direction perpendicular to the interface between the substrate 134 and the polycrystalline compact 138. While in conventional cutters such migration would be generally vertical, the corrugated/arched interface between the substrate 134 and the intermediate layer 144 encourages a flow pattern that more closely resembles a forty-five degree angle as indicated by the arrows 180. Thus, the cobalt 170 must travel a greater distance before it even contacts the polycrystalline compact 138 which forms the outer working layer 138.

In addition to the corrugated interface between the substrate 134 and the intermediate layer 144, the migration of cobalt can also be controlled by the microstructure of the intermediate layer 144. For example, using a fine grade of polycrystalline material (i.e. 0.5 to 20 $\mu$m) reduces the ability of the cobalt to migrate.

The use of certain binders, such as group VIII metals (cobalt, nickel and iron), or bonding mediums, such as a carbide, a nitride or a carbonitride of the IVb, Vb or VIb transition metals, can also inhibit flow of the cobalt 170. More specifically, the presence of a relatively large amount of the bonding medium, i.e. up to 30 percent by weight, closes the channels through which the cobalt would normally migrate. Thus, infiltration is significantly diminished.

Furthermore, it has been found that the use of small amounts of cobalt in the intermediate layer 144 provides an appropriate balance, thereby reducing migration of the cobalt 170 from the interface to the outer working layer 140. Thus, the use of an appropriate amount of cobalt, typically between 1 and 5 percent by volume, creates a barrier to larger amounts of cobalt traversing the intermediate layer. This is so because the diamond and carbide will react to form a new carbide. As the cobalt flows between the pores in the new carbide, the cobalt wets the diamond/carbide and thus acts as a binder rather than moving forward. Additionally, any cobalt present tends to inhibit the infiltration.

Infiltration of cobalt from the substrate to the normal PCD layer is impeded by the following phenomenon—with the presence of the intermediate layer in between, as a starting material, a finer granule diamond mixed with or without a cobalt binder provides a complete network/skeleton of intergrown diamond crystals through a HPHT catalytic sintering reaction which will significantly close the pathway of cobalt. This new grown polycrystalline formation from the starting diamond crystals mixed with cobalt binder will take place prior to the full cobalt diffusion so that the pathway is closed and cobalt penetration is also impeded. Furthermore, a mass of fine grain diamond powder which is highly densified under the high pressure would naturally provide a rather small pathway, which would be more difficult for the cobalt to penetrate through. Any cobalt which does migrate to the upper side 144b of the intermediate layer 144 tends to form a bond at the interface between the intermediate layer and the outer working layer 140, rather than infiltrating the outer working layer, due to the wetting aspect.

The working element 130 shown in FIG. 2C provides a significant improvement both in microstructure and response to high heat. When the working element 130 is subjected to heat, the outer working layer 138, being primarily highly thermoconductive polycrystalline material, will undergo little expansion. The substrate 134, being highly thermoexpansive, will expand significantly. The intermediate layer 144 will expand an intermediate amount and thereby prevent high stresses between the outer working layer 138 and the substrate 134.

Figure 2D:
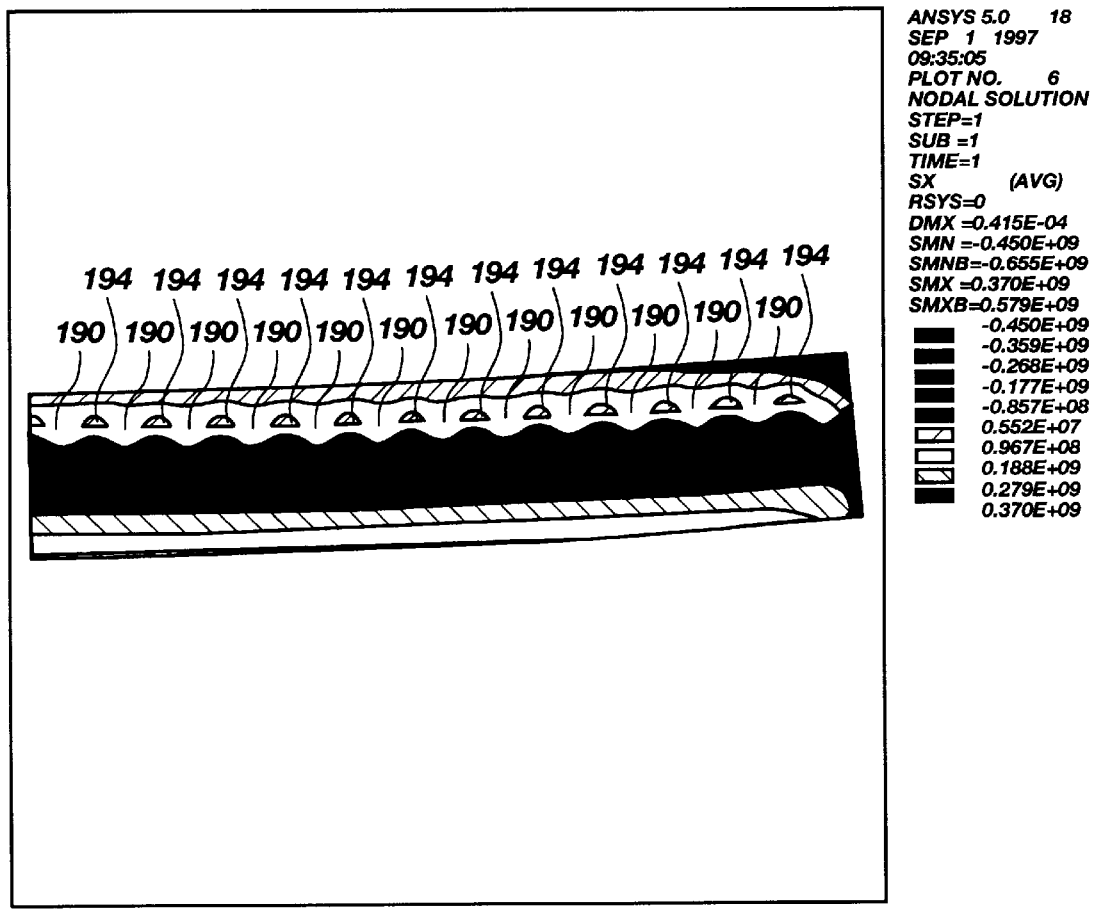
FIG. 2D shows a graph of Y-component stress which is perpendicular to the substrate of the polycrystalline working element when the compact is heated to 600 degrees C.

Additionally, because the corrugated design of the interface at the junction of the substrate 134 and the intermediate layer 144, the stresses within the working element 130 are also improved. As shown in FIG. 2D, the corrugated design produces alternating compression and tension regions 190 and 194. These alternating regions 190 and 194 improve the stability of the working element 130.

The embodiment described above also enables the improved dissipation of heat by the use of a thicker PCD or PCBN layer. In the prior art, the PCD or PCBN layer forming the outer work layer 140 would typically be about 0.5 mm. However, by using a corrugated substrate 134 having a 0.5 to 0.6 mm difference between the peak 154 and valley 158, and by having the intermediate layer extend to a level about 0.1 mm above the peaks 154, the upper surface 140a of the outer working layer 140 is disposed about 0.6 mm from the uppermost portion 154 of the corrugated substrate 134 and 1.2 mm from the lowest point 158 on the upper surface 134a of the corrugated substrate.

Figure 3:
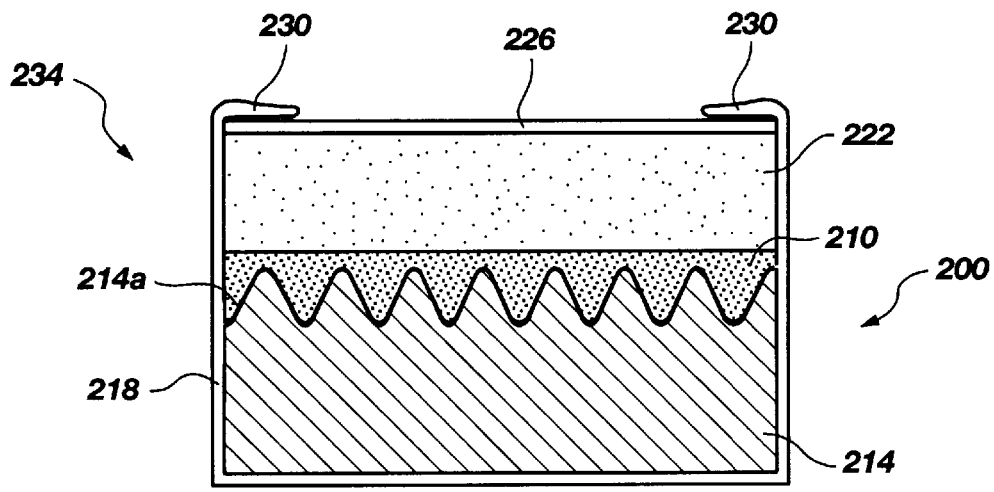
FIG. 3 shows a cross-sectional view of a polycrystalline working element being formed in accordance with the principles of the present invention.
Figure 4A:
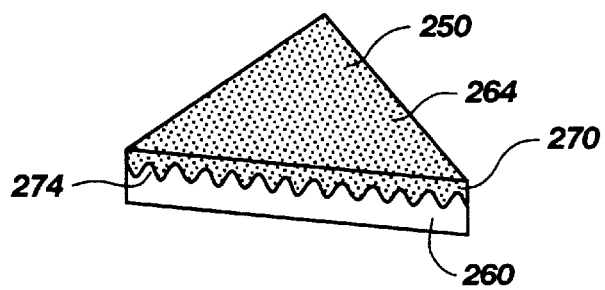
FIGS. 4A through 4D show a variety of tools with polycrystalline working segments disposed therein.
Figure 4B:
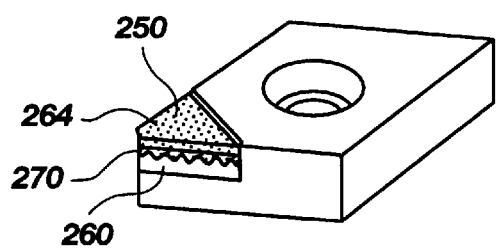
Figure 4C:
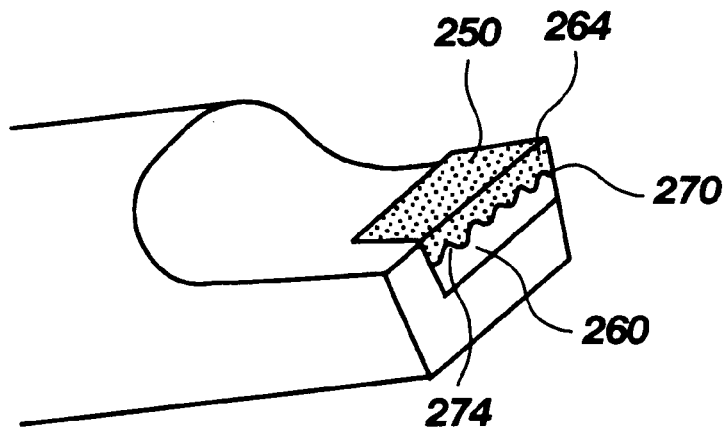
Figure 4D:
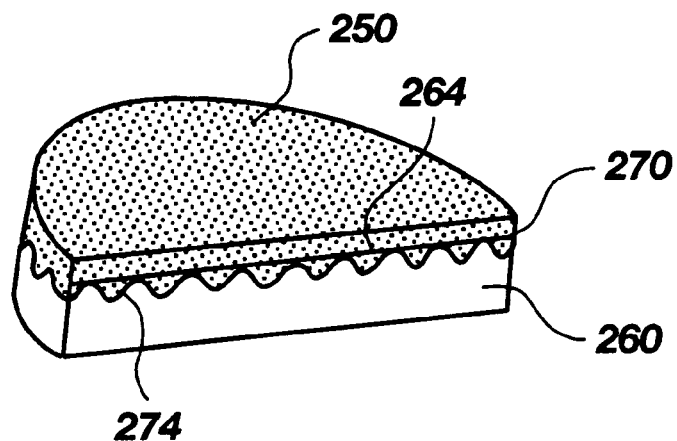

Turning now to FIG. 3, there is shown a cross-sectional view of a polycrystalline working element, generally indicated at 200, being formed in accordance with the principles of the present invention as set forth in example 1.

EXAMPLE 1

A feedstock for an intermediate layer 210 was prepared from a mixed powder of diamond in an average particle size of 3 $\mu$m and tungsten carbide powder of 0.8 $\mu$m average particle size in a volume ratio of 80:20. The ball milled powder was then fired by heating it in $H_2$ gas atmosphere at a temperature of 900° C. for two hours. A cobalt cemented tungsten carbide disk 214 with a corrugated surface on one side 214a was prepared within a tantalum cup 218. A PCBN feedstock for a PCBN compact layer 222 was also prepared using a cubic boron nitride powder of 2 $\mu$m average particle size and a binder agent of aluminum nitride, nickel and titanium nitride in a volume ratio of 98:2.

In accordance with traditional HPHT processing, the tungsten carbide disk 214 was loaded into the tantalum cup 218 and the feedstock for the intermediate layer 210 was loaded on top of the corrugated surface 214a. The feedstock for the outer working layer 222 was then placed on top of the feedstock for the intermediate layer 210. Finally, a multilayer tantalum disc 226 was loaded on top of the feedstock for the outer working layer 222. The ends 230 of the cup 218 were then crimped to enclose the inside material.

The loaded cup assembly, generally indicated at 234, was inserted into a typical HPHT reaction cell and the cell was placed in a conventional die/belt assembly with a hydraulic press. The pressure was raised to about 55 kb and then the temperature was elevated to approximately 1400° C. After maintaining the temperature and pressure for approximately 30 minutes, the temperature was lowered and the pressure was gradually reduced. The work element 200 was 35 mm in diameter and 4.3 mm in thickness. The sintered PCBN compact was ground and lapped to finish both sides and the circumferential area.

The PCD was then polished to examine the microstructure under the optical microscope and was subjected to EDX analysis. The sintered PCD showed an obvious arched intermediate layer (diamond sintered form) which is about 0.4 to 0.6 mm thick. A normal PCBN layer was disposed on top of the sintered PCD.

The PCBN outer working layer 222 appeared to be very strong and no obvious defects were observed. A total polycrystalline thickness, including the intermediate layer 210, was about 1.0 mm. The cobalt content of the new polycrystalline layers 222 and 210 was considerably less than that of typical tungsten carbide substrated PCBN with no intermediate layer. More specifically, the cobalt was found to be approximately 1 percent by weight, while conventional PCBN compacts are 10 to 12 percent by weight. A turning test performance of the work element 230 against a high speed steel demonstrated an improvement of about 30 percent over conventional PCBN compacts.

EXAMPLE 2

Cubic boron nitride powder of 3 $\mu$m in average particle size and titanium nitride 1 $\mu$m in average particle size and titanium carbide of 1 $\mu$m in average particle size were mixed in a volume ration of 60:20:20 for 10 hours through a ball milling in the tungsten carbide mill. This milled feedstock, which was used for an intermediate layer, was then cleaned in a vacuum furnace at 1100° C. for 2 hours and then applied into a manufacture of a new PCD tool in a manner similar to the method set forth in Example 1. The sintered PCD compact with a cubic boron nitride intermediate layer was polished by grinding and lapping in order to show a multilayer PCD consisting of a 0.6 mm thick intermediate layer on the bottom and a 0.5 mm thick normal PCD layer on the top.

It appeared to be strongly bonded at each interface of the tungsten carbide/intermediate layer interface and the intermediate layer/outer working layer interface. This new PCD (34 mm diameter×3.2 mm thickness) was then cut into various segments by wire EDM with no difficulties and the as-cut segments were shown individually as acceptable pieces with no signs of delamination or cracks. The segment was also checked through a typical heat treatment test, in comparison with normal PCD segments, by inserting the pieces into the furnace at 700° C., 740° C., and 800° C. The normal PCD was shown to be thermally damaged at 740° C. or above and the PCD layer treated at 800° C. was delaminated at the interface, while the new PCD segment under the present invention exhibited no obvious cracks or delaminations. It is noted that the new PCD layer is composed of PCD feedstock with a controlled amount of cobalt binder resulting in a tailored microstructure for higher heat resistant properties.

EXAMPLE 3

This experiment was designed to examine the effectiveness of the intermediate layer for heat and stress management during the cutting tool performance. Diamond powder having an average particle size of 3 μm and tungsten carbide powder having an average particle size of 0.8 μm were mixed in a volume ratio of 70:30 through ball milling in a tungsten carbide mill for 2 hours. This milled feedstock was diluted with ethyl alcohol to make into a slurry form. This slurry was then used as feedstock for the intermediate layer by pouring it into the arched or corrugated side of a cobalt cemented tungsten carbide disc sitting inside a tantalum metal cup. This cup assembly was then dried in the convection oven at 90 degrees C. for 1 hour followed by a vacuum firing at 1000 C. for 2 hours. After the cup assembly was removed from the furnace, a second loading of H2-fired diamond feedstock for a typical PCD compact layer was placed on top of the intermediate layer, as described in example 1. The sintered PCD compact then consists of a double layer of polycrystalline diamond in bonding with the tungsten carbide substrate layer: the top layer is a typical sintered, cemented or both formed PCD while the bottom layer is either a sintered or cemented PCD layer integrally bonded to the tungsten carbide layer. A final tool for internal testing was fabricated and tested against a 6% cobalt cemented tungsten carbide roll. The test parameters were chosen for severe, abusive testing, but the new PCD tool appeared to be well-sustained in contrast to the conventional PCD tool which failed as evidenced by a combined effect of overheat and faster wear. Specifically for higher cutting speed than the normal cutting parameters, the new PCD tool whose PCD layer thickness is close to 1.0 mm showed an improved performance by acting as a better heat dissipater and less thermal stress inducer.

Turning now to FIGS. 4A through 4D, there are shown a variety of tools with polycrystalline working segments 240. Each segment includes a substrate 260 formed of a material such as tungsten carbide, an outer working layer 264 which is formed of a polycrystalline material including either PCD or PCBN, and an intermediate layer 270 which is disposed there between. Preferably, the outer working layer 264 will have a thickness between 0.4 mm and 0.6 mm. The arches 274 which form the corrugated surface of the substrate 260 are preferably between 0.4 and 0.6 mm in height. To maintain a sufficient separation between the arches 274 and the outer working layer 264, the intermediate layer should be at least 0.15 to 0.2 mm at its thinnest point (above the peaks of the corrugated surface), and will typically be between 0.5 and 0.6 mm at its thickest point.

Figure 5A:
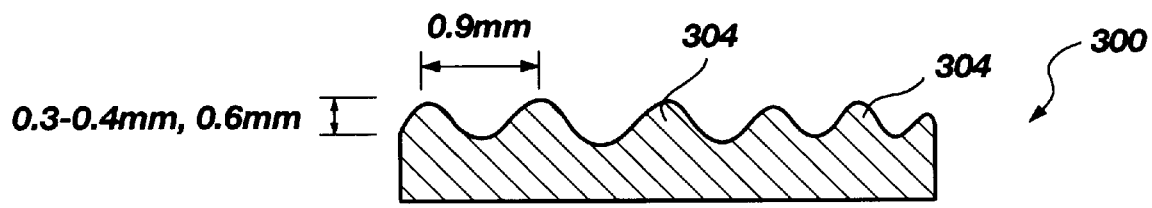
FIGS. 5A and 5B show cross-sectional views of alternate embodiments of substrates as may be used in accordance with the principles of the present invention.

Referring now to FIG. 5A, there is shown a substrate, generally indicated at 300, which is made in accordance with the present invention. While each of the substrates shown and discussed above terminate in a relatively pointed apex, the substrate 300 of FIG. 5A is a plurality of broadly rounded projections 304. One problem with using sharp projections is that they have a tendency to cause cracking within the PCD compact. By rounding the edges of the projections, cracking can be significantly reduced.

As shown in FIG. 5A, the projections are preferably 0.3 to 0.4 mm in height and preferably no more than 0.6 mm. Also as shown in FIG. 5A the distance between adjacent peaks is 0.9 mm. Thus, if an intermediate layer extends 0.5 mm above the lowest most point, it will be able to extend slightly above the tops of the peaks as the peaks are in the preferred range.

Figure 5B:
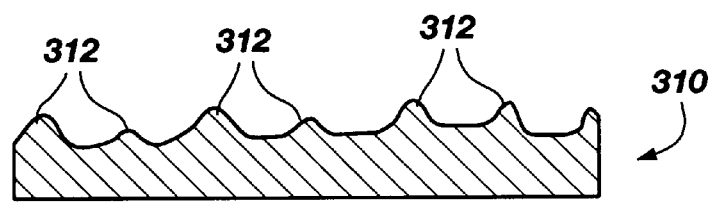

Turning now to FIG. 5B, there is shown yet another embodiment of a substrate, generally indicated at 310 having a plurality of peaks 312. Unlike the embodiment in FIG. 5A and those discussed with respect to the prior figures, the peaks shown 312 in FIG. 5B are of different heights, are unevenly spaced, and no "valley" is formed extending into the main portion of the substrate. FIG. 5B demonstrates that it is not necessary to have a uniform substrate surface on which the intermediate layer is formed in order for the invention to function properly. The intermediate layer easily fills different sized spaces between adjacent peaks and provides a layer to separate the peaks from the outer working layer (not shown) of the diamond compact tool.

While several different embodiments of the invention are describe herein, each tends to share the major advantages of the present invention. First, by controlling infiltration of the cobalt and preventing any significant infiltration of the outer working layer, the wear characteristics of the PCD or PCBN compact are significantly improved. Additionally, by limiting migration of the cobalt, the development of pores in the tungsten carbide adjacent the interface with the diamond particles is reduced. This, in turn, reduces the risk that the diamond compact will break free from the substrate.

Thus there is disclosed an improved supported PCD/PCBN tool with an arched intermediate layer. Those skilled in the art will appreciate numerous modifications which can be made without departing from the scope and spirit of the present invention. The appended claims are intended to cover such modifications.

What is claimed is:

1. A new supported polycrystalline compact, the compact comprising:
   a substrate configured for receiving a polycrystalline element, the substrate having a plurality of projections;
   an intermediate layer having a plurality of super hard crystals bonded together, and bonding medium therefor, the super hard crystals being at least 50 percent by volume of the intermediate layer, the intermediate layer being configured for nesting between the projections of the substrate and being bonded thereto; and
   a polycrystalline outer layer bonded to the intermediate layer, said outer polycrystalline layer being isolated from the projections of the substrate by the intermediate layer.

2. The supported compact of claim 1, wherein the bonding medium comprises at least one of the group consisting of a carbide, nitride, a carbonitride of the IVb, Vb, VIb transition metals.

3. The supported compact of claim 1, wherein the outer layer and the intermediate layer each include plurality of crystals and bonding medium for holding the crystals together, and wherein the intermediate layer has a higher concentration of bonding medium than the outer layer.

4. The supported compact of claim 3, wherein the intermediate layer's content of bonding medium is at least 30% by volume.

5. The supported compact of claim 1, wherein said super hard crystals of the intermediate layer further comprises a fine grade polycrystalline material having a pre-bonding average particle size of about 0.5 to about 20 μm.

6. The supported compact of claim 1, wherein said intermediate layer further comprises a binding agent.

7. The supported compact of claim 6, wherein said binding agent further comprises at least one of the group consisting of group VIII metals.

8. The supported compact of claim 7, wherein said binding agent is a member selected from the group consisting of cobalt, nickel, and iron.

* * * * *